Patented Jan. 21, 1947

2,414,770

UNITED STATES PATENT OFFICE 2,414,770

PRODUCTION OF DIOLEFINS BY CRACKING OF POLYMERS

Helmuth G. Schneider, Roselle, and Vincent F. Mistretta, Scotch Plains, N. J., assignors, by mesne assignments, to Jasco, Incorporated, a corporation of Louisiana No Drawing. Application December 19, 1940, Serial No. 370,794

8 Claims. (Cl. 260—680)

This invention relates to the production of diolefins and more particularly it relates to improvements in the yield of diolefins obtained by cracking hydrocarbons.

Diolefins are very valuable raw materials for the preparation of numerous chemical derivatives and for the production of synthetic rubbers, some of which are in many ways superior to natural rubber with respect to abrasion resistance, resistance to oxidation, etc. The use of such synthetic rubbers has been restricted due to the high cost of manufacture when compared to the cost of manufacture of various articles when natural rubber is used. The high cost of production of such synthetic rubbers is largely due to the involved process so far developed for the preparation of diolefins. For example, in the manufacture of butadiene the best known process is that in which acetylene is first formed and then hydrated to form acetaldehyde, which is in turn condensed to aldol and then hydrogenated to butylene glycol and finally dehydrated to butadiene. Even if good yields are obtained in the individual steps the process is too expensive to make possible the preparation of cheap butadiene.

It is well known that hydrocarbons on being cracked at high temperatures give small quantities of diolefins. The diolefin content of the cracked product is usually 1% to 5% depending on the temperature and pressure of the cracking operation, lower pressures tending to give larger amounts of diolefins. Yields of butadiene from the pyrolysis of mono-olefins have been reported to be higher than those from the corresponding saturated hydrocarbons but in no case has the yield of butadiene been high enough to justify the commercial production of this diolefin by cracking of an aliphatic hydrocarbon.

Recently much attention has been paid to the production of butadiene from butene-2 by "cracking." This reaction is really a dehydrogenation reaction in that two hydrogens are removed from the olefin molecule. Wheeler and Wood, in the Journal of the Chemical Society of 1939, page 1819, report that it is possible to crack 2-butene in a temperature range of 600° C. to 900° C. and at a contact time of from 10 to 20 seconds to obtain 0.4 to 1.7% of butadiene. Practically identical products were obtained when cracking either 1-butene or 2-butene under these conditions. Tropsch, Parrish and Egloff, in the Industrial and Engineering Chemistry, vol. 28, page 581 of 1936, state that fairly good yields of butadiene from 2-butene may be obtained when operating at a highly reduced pressure. A pressure of 50 mm. of mercury and a temperature of 1100° C. are cited as being highly favorable operating conditions in order to get maximum yields of butadiene. However, cracking operations under a vacuum of this order are difficult and expensive to carry out.

According to this invention it has been found that the chemical structure of the feed stock to a large extent determines the yield of diolefins obtained on cracking. Highly branched hydrocarbons give particularly high yields. Where, as pointed out above, the diolefin content of cracked products from the usual feed stocks contain 1–5% diolefins, the examples cited below give yields of 30–50%. It has been found, for example, that tertiary olefins and particularly their polymers and copolymers with other olefins are excellent feed stocks for the production of diolefins. Such feed stocks are best produced by polymerization of the tertiary olefins in the $C_4$, $C_5$ and $C_6$ naphthas available in the refinery by methods well known to the art, i. e., either by extraction of the tertiary olefins in the cold by acids followed by polymerization of the olefin in the extract, by direct polymerization of the tertiary olefins in the naphtha or copolymerization with other olefins by contacting with acids or acidic contacting agents. They may also be produced as by-products in the manufacture of secondary alcohols from refinery gases or naphthas.

The cracking may be carried out with or without catalysts at temperatures above 800° F., preferably 1200–1400° F., and at pressures below, at, or above atmospheric.

*Expt. A.—Cracking of the dimer of trimethyl ethylene—B. P. 149–166° C.*

[Temp.=1200° F. Catalyst=Copper gauze]

| Analysis of cracked product | Volume percent on feed | Percent diolefin in cut (by weight) |
|---|---|---|
| $C_3$ cut, B. P. −10° C | 2.4 | Not measured (40% isobutylene, 98% total olefin in $C_4$ cut). |
| $C_4$ cut, −10 to +5° C | 14.0 | |
| $C_5$ cut, 5 to 40° C | 7.6 | |
| $C_6$ cut, 40 to 75° C | 12.6 | 34.6. |
| $C_7$ cut, 75 to 100° C | 7.6 | 57.7. |
| $C_8$ cut, 100–130° C | 8.0 | 43.7. |
| $C_9$ cut, 130–150° C | 5.6 | 32.2. |
| Bottoms $C_9$+ | 8.6 | 34.2. |

*Expt. B.—Cracking of dimer of trimethyl ethylene—B. P. 149–166° C.*

[Temp.=1200° F. Catalyst=Chromic oxide on bauxite]

| Analysis of cracked products | Volume percent on feed | Percent diolefin in cut (by weight) |
|---|---|---|
| $C_3$ cut, B. P. −10° C | 3.8 | 68% olefins. |
| $C_4$ cut, −10° C. to +5° C | 16.2 | Isobutylene=37.6%, total olefin=78%. |
| $C_5$, 5–40° C | 13.7 | 49.3. |
| $C_6$, 40–75° C | 12.7 | 55.4. |
| $C_7$, 75–100° C | 7.8 | 53.2. |
| $C_8$, 100–130° C | 6.5 | 31.0. |
| $C_9$, 130–150° C | 5.5 | 42.3. |
| Bottoms, 150° C | 5.3 | |

*Expt. C.—Cracking of isobutylene polymer (trimer)*

[Catalyst=Copper gauze. Temp.=1200° F.]

| Analysis of cracked products | Volume percent on feed | Percent diolefin in cuts (by weight) |
|---|---|---|
| C₃, B. P. −40 to −10° C | 8.0 | Not determined. |
| C₄, −10 to +5° C | 45.4 | Not determined (72% isobutylene, 92% total olefin). |
| C₅, 5-40° C | 5.8 | 50.7. |
| C₆, 40-75° C | 5.0 | 50.0. |
| C₇, 75-100° C | 5.2 | 42.2. |
| C₈, 100-130° C | 7.2 | 38.6. |
| C₉, 130-150° C | 3.2 | 48.3. |

The above examples illustrate the large yields of diolefins obtainable on cracking polymers and copolymers of tertiary olefins. All these fractions can be polymerized (even the C₉ cuts) with BF₃ or AlCl₃ to give high molecular weight polymers or be copolymerized with known substances such as isobutylene, acrylonitrile, styrene, etc.

It is of interest that triisobutylene, which is at present cracked over clay at 800° F. gives no diolefins, when heated to 1200° F. gives large amounts of diolefins in addition to the isobutylene. Consequently, it is possible by cracking triisobutylene to produce mixtures of isobutylene and diolefins which can be copolymerized with AlCl₃ or BF₃ to give high molecular weight polymers.

We claim:

1. Process for the production of diolefins which comprises subjecting polymers having at least 10 carbon atoms to the molecule prepared by polymerizing tertiary olefins to temperatures ranging from 800° F. to 1400° F.

2. Process for the production of diolefins which comprises subjecting polymers having at least 10 carbon atoms to the molecule prepared by polymerizing tertiary olefins which tertiary olefins had 4 to 6 carbon atoms to the molecule to temperatures ranging from 800° to 1400° F.

3. Process for the production of diolefins which comprises subjecting polymers having at least 10 carbon atoms to the molecule prepared by polymerizing tertiary olefins which tertiary olefins had 4 to 6 carbon atoms to the molecule at temperatures ranging from 1200° to 1400° F.

4. Process for the production of diolefins which comprises polymerizing tertiary olefins having from 4 to 6 carbon atoms to the molecule to form polymers having at least 10 carbon atoms to the molecule and subjecting the polymers thereby formed to temperatures ranging from 1200° to 1400° F.

5. Process for the production of diolefins which comprises subjecting the polymers having at least 10 carbon atoms to the molecule prepared by polymerizing tertiary olefins having from 4 to 6 carbon atoms to the molecule to temperatures ranging from 1200° to 1400° F.

6. Process for the production of diolefins which comprises subjecting the polymers having at least 10 carbon atoms to the molecule prepared by polymerizing tertiary olefins which tertiary olefins had from 4 to 6 carbon atoms to the molecule to temperatures ranging from 1200° to 1400° F. in the presence of a catalyst.

7. Process for the production of diolefins according to claim 4 in which the catalyst is copper gauze.

8. Process for the production of diolefins according to claim 4 in which the catalyst is chromic oxide on bauxite.

HELMUTH G. SCHNEIDER.
VINCENT F. MISTRETTA.